May 22, 1956
E. V. HARLOW
2,746,563
PURIFICATION OF GASES
Filed June 9, 1953
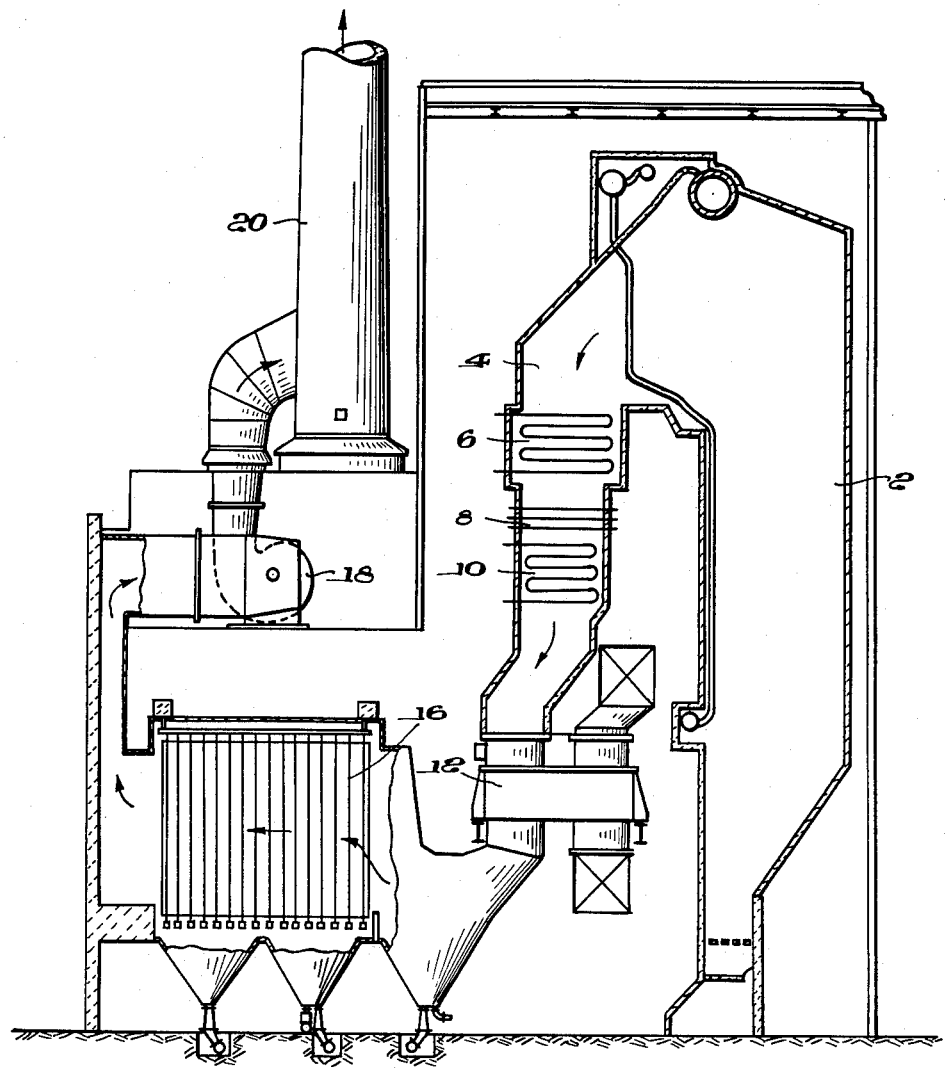
INVENTOR.
EARL V. HARLOW.
BY
Walter J. Monarelli
ATTORNEY

United States Patent Office 2,746,563
Patented May 22, 1956

2,746,563

PURIFICATION OF GASES

Earl V. Harlow, Towson, Md., assignor to Koppers Company, Inc., a corporation of Delaware Application June 9, 1953, Serial No. 360,531

6 Claims. (Cl. 183—114)

The present invention relates to a process of purifying gases and more particularly to a process of treating stack gases emanating from a combustion chamber and which eventually pass to an electrostatic precipitator.

In the prior art, stack gases derived from a combustion chamber have been passed to an electrostatic precipitation zone in order to remove the fly ash in the gases, thus reducing the possibilities of atmospheric pollution and effecting a recovery of valuable materials which might be present in the gases. When the gases pass thru the electrostatic precipitation zone, it is important that the fly ash present have sufficient electrical conductivity for efficient precipitation. If the ash has a high resistivity, a phenomenon known as "back discharge" occurs and the efficiency of the precipitator is greatly reduced.

When the resistance of the dust layer accumulating on the collecting electrode of the precipitator is too high, this phenomenon of "back discharge" prevents the charge, which ordinarily flows to ground, from escaping as fast as new ions arrive from the discharge electrode. As a result, the potential at the surface of the dust layer increases. If the potential builds high enough, an arc from the surface of the dust layer to the grounded electrode occurs. The arc produces a swarm of ions, both positive and negative causing trouble in several ways. The high local conductivity of the gas is very apt to cause a spark to occur between the discharge and grounded electrodes. This sparking gives rise to a surging current flow and the voltage necessarily must be reduced to avoid opening the breakers. The excessive sparking and the resulting inability to operate at normal voltage and current are the usual symptoms of "back discharge." The subnormal corona flow and lack of a strong and constant electrostatic field causes a lower efficiency of the precipitator.

This problem of "back discharge" recently has become more acute in the electrostatic precipitation art since the increased demand for electric power and the increased cost of fuels has increased the demand for fuels not heretofore used because many created problems such as "back discharge."

For many years, large stocks of anthracite screenings from the anthracite coal regions of Pennsylvania have accumulated because they have been found too fine for domestic fuel consumption. With the growing demand for electric power and the increased cost of other fuels, it has become increasingly more desirable for electric power plants to utilize these accumulating fines in the firing of coal burning boilers. However, one of the major difficulties in the utilization of these fines up to the time of the present invention has been the resulting problem of "back discharge." For when an electric precipitator is applied on the stack gas from an anthracite-fired boiler, "back discharge" occurs as a result of the high electrical resistivity of the ash deposited on the electrodes.

In the past, various processes have been employed to eliminate this phenomenon. Attempts have been made to condition the stack gases with water vapor before the gases enter the precipitators, but the amount of water necessary to eliminate "back discharge" caused bonding of the ash and resulted in short circuiting of the precipitator.

When steam was used in place of water, the problem of bonding was reduced but steam never achieved the same response as the equivalent weight of water. Moreover, the use of steam was not desirable because of the comparatively prohibitive cost.

Processes have also been used wherein $H_2SO_4$ has been added from an outside source to the stack gas stream before it enters the electrostatic precipitation zone. The $H_2SO_4$ gathers on the fly ash particles in the gases, lowering the resistivity of these particles and eliminating the problem of "back discharge." However, such addition of $H_2SO_4$ to the gas stream from an outside source also has its disadvantages, for it is not only costly but it presents hazards to personnel not accustomed to handling dangerous chemicals. Moreover the acid is highly corrosive to the equipment by which it is added.

One of the features of the present invention is to provide a process for treating stack gases destined for an electrostatic precipitator whereby the efficiency of precipitation is increased by eliminating the problem of "back discharge."

Another feature of the present invention is to provide such a process as aforementioned which is more straightforward and economical than any process heretofore known.

Still another feature of the present invention is to provide such a process as aforementioned which eliminates the handling hazards of other processes heretofore known.

More particularly, the present invention teaches a process for treating stack gases containing $SO_2$ emanating from a combustion chamber and passing in a stream to an electrostatic precipitation zone, comprising contacting said stream with a catalytic surface of sufficient area to convert a portion of said $SO_2$ to $SO_3$ before said stream enters said precipitation zone. The presence of $SO_3$ in the gases undergoing treatment has a beneficial effect in that it largely eliminates the "back discharge" described above.

It will be obvious to one skilled in the art that various modifications and changes can be made in the steps set forth in the following illustrated embodiments of the invention without departing from the spirit or scope thereof.

Referring to the schematic drawing, stack gases are passed from a combustion chamber 2 in a stream from stack 4 thru a waste heat recovery system 6. Although a combustion chamber of a coal-fired boiler is schematically shown, it is to be understood that this represents only one embodiment of the invention and that the present invention is applicable as well to gases emanating from other types of coal-fired chambers. The stream of stack gases which necessarily contain a portion of $SO_2$ therein, the percentage of $SO_2$ varying with the type of coal fired, is then passed from the waste heat recovery system 6 into contact with catalyst rods 8 where a portion of the $SO_2$ is converted to $SO_3$. The stream of gas is then successively passed thru an economizer 10 and an air preheater 12, thru electrostatic precipitator 16 where the fly ash in the precipitator is removed. From the precipitator 16, the stream of gas is pumped by pump 18 thru stack 20 to the atmosphere.

The catalyst rods may be made up from one of several chemical materials known to effectively convert $SO_2$ to $SO_3$. It has been found that platinum-alumina coated rods satisfactorily serve the purpose as a catalyst. However, zinc oxide, vanadium pentoxide or other suitable catalytic coatings may also be used to effect the conversion. The area of catalytic surface that contacts the stream of stack gases varies with the portion of $SO_2$ in the gas that is to be converted to $SO_3$, and the effectiveness of the catalyst varies with the temperature and velocity of the gas stream. In most instances, in order to avoid "back discharge" in the precipitator zone, it is only necessary to convert a minor portion of the $SO_2$ to $SO_3$.

The concentration by volume of the $SO_3$ in the gas when it enters the electrical precipitator should vary between about 0.001% and about 0.004%, contingent upon the temperature and humidity of the stack gases and with normal temperature and humidity about 0.002% is preferred. It is to be understood that the percentage of conversion of $SO_2$ to $SO_3$ to arrive at these concentrations will vary with the concentration of $SO_2$ in the stack gases, which in turn is determined by the sulfur content of the coal burned.

As an example, when a coal is burned with a 0.7% sulfur content and a normal amount of excess air, the concentration of $SO_2$ in the stack gases will be about 0.05% by volume. To obtain the preferred concentration of $SO_3$ of about 0.002% by volume in the gases, only 4% of the $SO_2$ is converted to $SO_3$.

Although the schematic drawing discloses the stack gas stream as contacting the catalyst 8 before the economizer 10, it is to be understood that the catalytic contact may be made after the economizer 10 or at any other place between the combustion chamber 2 and the electrostatic precipitator 14 in accordance with the results desired to be obtained, the exact location of the catalytic surface being determined by such factors as the temperature and velocity of the gas stream.

In order to eliminate the possibility of plugging small passages, the catalyst is mounted on adequately spaced steel tubes or rods or it can be mounted on adequately spaced porcelain tubes supported on rods or pipes. The amount of surface of catalyst exposed depends upon numerous factors such as the amount of $SO_2$ in the gas stream, the temperature at the location of the catalyst and the type catalyst used. The surface exposure can be controlled by the length, diameter and number of tubes used.

Since the catalyst will be suspended in an extremely dirty atmosphere where dust is likely to collect on its surface, auxiliary cleaning means like a soot blower can be provided to periodically blow the dust off the catalyst.

The invention claimed is:

1. A process to reduce back discharge in the electrical precipitation of fly ash from combustion chamber stack gases containing $SO_2$ comprising the steps of passing said stack gases emanating from a combustion chamber, prior to the precipitation of the fly ash in said gases, through a zone having disposed therein a catalytic surface of sufficient area to convert a portion of said $SO_2$ to $SO_3$, and subsequently passing said gases to an electrical precipitation zone to remove the fly ash from said gases.

2. The process of claim 1 wherein the conversion of said $SO_2$ to $SO_3$ is such that the concentration by volume of $SO_3$ in the gas stream ranges between about 0.001% and about 0.004% by volume.

3. The process of claim 1 wherein the conversion of the minor portion of said $SO_2$ to $SO_3$ is such that the concentration by volume of $SO_3$ in the gas stream is about 0.002% by volume.

4. The process of claim 1 wherein said stack gas stream emanates from the combustion chamber of a coal-fired boiler.

5. The process of claim 4 wherein said stack gas stream is passed through an air preheater zone after said stream has been contacted with a catalyst and before said stream enters said precipitation zone.

6. The process of claim 4 wherein said stack gas stream is passed through an economizer zone before said stream has been contacted with said catalytic surface, and upon contact with said surface is then passed through an air preheater zone and into said precipitator zone.

References Cited in the file of this patent

UNITED STATES PATENTS

| | | |
|---|---|---|
| 1,043,580 | Eldred | Nov. 5, 1912 |
| 1,971,855 | Heimrod | Aug. 28, 1934 |
| 2,537,588 | Tigges | Jan. 9, 1951 |
| 2,602,734 | Hedberg, et al. | July 8, 1952 |